(12) United States Patent
Laarhuis et al.

(10) Patent No.: US 8,000,356 B2
(45) Date of Patent: Aug. 16, 2011

(54) CONNECTING SYSTEM, INVERSE MULTIPLEXER, DATA COMMUNICATION NETWORK, METHOD AND COMPUTER PROGRAM

(75) Inventors: Jan Herman Laarhuis, Enschede (NL); Bart-Jan Sweers, 's Gravenhage (NL)

(73) Assignee: Nederlandse Organisatie Voor Toegepast-natuurwetenschappelijk Onderzoek TNO, Delft (NL)

( * ) Notice: Subject to any disclaimer, the term of this patent is extended or adjusted under 35 U.S.C. 154(b) by 732 days.

(21) Appl. No.: 10/560,188

(22) PCT Filed: Jun. 9, 2004

(86) PCT No.: PCT/NL2004/000406
§ 371 (c)(1),
(2), (4) Date: Feb. 20, 2007

(87) PCT Pub. No.: WO2004/109983
PCT Pub. Date: Dec. 16, 2004

(65) Prior Publication Data
US 2007/0223400 A1    Sep. 27, 2007

(30) Foreign Application Priority Data
Jun. 10, 2003    (NL) ..................................... 1023631

(51) Int. Cl.
*H04J 3/04*    (2006.01)
*H04J 3/02*    (2006.01)
(52) U.S. Cl. .......................... 370/535; 370/536; 370/537
(58) Field of Classification Search ........................ None
See application file for complete search history.

(56) References Cited

U.S. PATENT DOCUMENTS

| 6,891,825 | B1 * | 5/2005 | O'Dell et al. | 370/352 |
| 6,959,019 | B2 * | 10/2005 | Roberts et al. | 370/535 |
| 7,068,687 | B2 * | 6/2006 | Mueller | 370/536 |
| 7,440,475 | B2 * | 10/2008 | Kubo et al. | 370/535 |
| 2002/0041604 | A1 * | 4/2002 | Ferguson | 370/466 |
| 2004/0042510 | A1 * | 3/2004 | Bremer et al. | 370/539 |
| 2006/0007950 | A1 * | 1/2006 | Okumura et al. | 370/441 |

FOREIGN PATENT DOCUMENTS
EP    1009154 A2    6/2000
WO    WO 01/91383 A1    11/2001

OTHER PUBLICATIONS
International Search Report, Aug. 23, 2004.

* cited by examiner

Primary Examiner — Kwang B Yao
Assistant Examiner — Jutai Kao
(74) Attorney, Agent, or Firm — Leydig, Voit & Mayer, Ltd (57) ABSTRACT

Throughput between personal computers and the Internet is increased by using inverse multiplexing over local loop telephone lines of different users. The different personal computers share the multiple intersubnetwork connections with each other, so that the efficiency of the use of the intersubnetwork connections is increased. Each of the computers is capable of receiving and/or transmitting inverse-multiplexed data signals over the same plurality of intersubnetwork connections. Preferably, at each computer, use is made of a separate connecting device locally coupled to the computer and an intersubnetwork connection and remotely coupled to one or more other such connecting devices. The connecting devices are placed in different housings, each having a regular connection with a local computer and a wireless transmission connection to corresponding connecting devices in neighboring housings. The interchanged data are inverse-multiplexed and transmitted via the intersubnetwork connections as inverse multiplex data.

11 Claims, 4 Drawing Sheets

CONNECTING SYSTEM, INVERSE MULTIPLEXER, DATA COMMUNICATION NETWORK, METHOD AND COMPUTER PROGRAM

FIELD OF THE INVENTION

The invention relates to a telecommunication network connecting a first subnetwork and a second subnetwork, preferably via a number of local loop telephone lines, a connecting device for use in such a telecommunication network, a method for transmitting data between a first subnetwork and a second subnetwork and a computer program.

BACKGROUND

PCT Patent Application WO 02/41660 describes how inverse multiplexing can be used to distribute data communication between a computer system and the Internet over a plurality of telephone lines, so that a combined bandwidth is obtained which is higher than the bandwidth over a single telephone line. For the connection of computer systems in houses with networks located outside the houses, such as the Internet, a wide range of possible connections with networks is known, such as dial-up lines, ISDN lines and ADSL lines and cable television connections. Such networks will be referred to as telecommunication networks in the sense that the network connects nodes remote from each other, in different buildings, with each other, without this being limited to the telephone network.

In this application, the following italicized terms are understood to mean at least the following, respectively. A *network* is formed by two or more nodes which are at least indirectly connected with each other. A (network) *node* is at least understood to mean: any device, such as for instance a computer, switching device, or other device, present in a data communication network and connected with one or more other nodes by means of a connection. A(n) (network) *end node* is a network node located at the end of a network, such as for instance a client computer in a client-server network or a telephone in a telephone network. In general, an end node generates data, while other nodes only transmit data. A *connection* is understood to mean a physical connection between at least two network nodes which is suitable for the transmission of data-representing signals between the network nodes. A connection may be any suitable medium such as for instance a cable or a wireless radio connection. A connection between nodes in two different (sub)networks is referred to as an *inter(sub)network connection*, while an *intra(sub)network connection* is understood to mean a connection between nodes in the same (sub)network.

A *multiplexer* is at least understood to mean: a device or apparatus which can combine at least two separate flows of data signals into one single flow of multiplex data signals. In this application, this symbol is used for a multiplexer: mux. A *demultiplexer* is a device which can recover the original flows of data signals from a flow of multiplex data signals. This symbol is used for a demultiplexer: demux. An *inverse multiplexer* is a device or apparatus which can split one single flow of data signals into at least two separate flows of inverse multiplex data signals. This symbol is used for an inverse multiplexer: $mux^{-1}$. An *inverse demultiplexer* is a device or apparatus which can combine flows of inverse multiplex data signals into the original, single flow of data signals. This symbol is used for an inverse demultiplexer: $demux^{-1}$.

It is noted that both (de)multiplexers and inverse (de)multiplexers may have been arranged to simultaneously operate on two or more incoming flows. It is also noted that both (de)multiplexers and inverse (de)multiplexers are generally known per se in the field of data communication, for instance from Alex C. Snoeren, 'Adaptive Inverse Multiplexing for Wide-Area Wireless Networks', in Proceedings of IEEE GlobeCom, Rio de Janeiro, December, 1999. Luiz Magalhaes and Robin Kravets, 'End-to-End Inverse Multiplexing for Mobile Hosts', in Proceedings of the 19th Brazilian Symposium on Computer Networks, Florianopolis, Brazil, 2001 and K. Sklower et all, 'The PPP Multilink Protocol', IETF RFC 1990, August, 1996.

Data communication networks with subnetworks connected via a connecting system are generally known. For instance, for the connection of computer systems in houses with networks located outside the houses, such as the Internet, there is a wide range of possible data communication networks.

Known are, for instance, networks where there is one single connection per house, with which one single end node, such as a personal computer present in the house, is connected with a dial-up server. The connection may, for instance, comprise a POTS (plain old telephone system) or an ISDN (integrated services digital network) line and modems and other network equipment suitable for this. In this case, the end node forms the only node in a first subnetwork in the house, while the dial-up server forms a node in a second subnetwork located outside the house, which connects the first and second network. However, such a configuration is inefficient because the available capacity of the connection between the subnetworks is not utilized or not completely utilized for most of the time.

It is also known, when there are multiple end nodes in a house, to connect these with a network located outside the house. It is, for instance, known to provide an internal network in a house which comprises multiple end nodes, for instance personal computers, and a node connecting the internal network with the network located outside it, for instance a home router. This internal network then forms a first subnetwork completely located inside the house. The connecting node can then be connected with another subnetwork outside the house, for instance the Internet or the like, by means of a suitable data connection. In that case, by statistical multiplexing, the available capacity of the connection between the subnetworks can be utilized more optimally than when only one end node is present in the first subnetwork, because, with statistical multiplexing, the peaks and troughs in the data flows generated by the different end nodes can average each other out.

However, in particular in networks with computer systems in houses of consumers, but also in other networks, there is a need for an increase of the throughput of data both from and to the end nodes. The throughput to the end nodes is also referred to as "download speed", while the throughput from the end nodes is also referred to as upload speed". For increasing a throughput, different solutions are known, such as for instance replacing a narrowband connection by a broadband connection for each individual house. For instance, an asymmetric digital subscriber line (ADSL) or a data connection via the television cable of the house with a network located outside the house can be installed to replace a POTS or ISDN line. With these known broadband connections, a download speed can be obtained which is usually between 0.5 and 2 Mbps and an upload speed between 0.1 and 0.5 Mbps.

However, these known solutions for increasing the throughput have the drawback that, although the throughput is sufficient by current standards, there will be a need for a further increase of the throughput in the (near) future. However, increase of this throughput requires great and expensive adjustments to the existing infrastructure, such as for instance the installation of glass fiber cables into the house.

The inverse multiplexing and/or demultiplexing described in PCT Patent Application WO 02/41660 meets this need for increase of the bandwidth. However, the proposed solution has the drawback that each connection can only be used by the end nodes in one individual house. As a result, the bandwidth is utilized inefficiently in time because, for a great part of the time, the maximum available data capacity is not completely used by the end node, for instance because the users of the end nodes are absent for a great part of the time or utilize only a part of the available capacity.

SUMMARY OF THE INVENTION

It is the general object of the invention to provide an improved connecting system for connecting a first subnetwork and a second subnetwork in a data communication network. In particular, it is the object of the invention to provide a connecting system by means of which the throughput between subnetworks can be utilized more efficiently and can simply be increased.

To this end, the invention provides a network according to claims 1 and 2. In such a network, the throughput between subnetworks in a data communication network can be utilized more efficiently. The data transmitted from or to a node, such as a personal computer or a bundling of personal computers, are distributed over the multiple intersubnetwork connections such as local loop telephone lines by inverse multiplexing. For this purpose, different nodes share the multiple intersubnetwork connections. Each of the nodes is capable of receiving and/or transmitting original data which are transmitted over the shared plurality of intersubnetwork connections in an inverse-multiplexed manner. Thus, a plurality of inverse multiplex/demultiplex subsystems is provided, each for a respective node, while the different inverse multiplex/demultiplex subsystems share the multiple intersubnetwork connections with each other. On the side of the nodes, each inverse multiplex/demultiplex subsystem comprises, for each node, an inverse multiplexer and/or demultiplexer coupled to the node.

Preferably, for this, at each node, use is made of a separate connecting device which is, on the one side, locally coupled to the node and a intersubnetwork connection and, on the other side, remotely coupled to one or more other(s) of such connecting devices. Such connecting devices are, for instance, placed in different housings, each with a, for instance, regular connection with a local computer and a, for instance, wireless transmission connection to corresponding connecting devices in neighboring housings. Here, the local connecting device provides the inverse multiplexing and/or demultiplexing of original data from or for the local node. One part of the inverse multiplex signals is communicated via the local intersubnetwork connection and another part is communicated via the other connecting devices over other intersubnetwork connections. At least in this sense, the connections between the connecting devices form a subnetwork, without the term "subnetwork" implying whether it is possible or not to interchange other messages outside of the intersubnetwork connections, for instance from computer to computer via the connecting device.

By using different inverse multiplexers and/or demultiplexers for different nodes, compared to the use of one central multiplexer for these nodes, less bandwidth is necessary for the combination of traffic from the nodes to the inverse (de) multiplexers and from there to the different intersubnetwork connections.

The data transmitted from a node in the first subnetwork to the second subnetwork, by the inverse multiplexer over the intersubnetwork connections at least indirectly connected thereto, can be transmitted as inverse multiplex data. The inverse multiplex data can be converted into the original data again on the second subnetwork side. An end node in the first subnetwork can thus use multiple intersubnetwork connections for transmitting data. The combined throughput of the intersubnetwork connections thus forms the total, maximum available throughput for that end node.

Further, the throughput can simply be increased by connecting one or more extra intersubnetwork connections with the inverse multiplexer. In addition to providing the added intersubnetwork connection(s), this requires no further infrastructural adjustments such as for instance changing the type of connection. Then, the data flows can simply be distributed over the already existing and the added intersubnetwork connections via the at least one inverse multiplexer.

When, in the first subnetwork, multiple nodes are connected with the connecting system, which each generate a data flow with a varying size, the fluctuations in the separate data flows of the nodes can mutually compensate each other. Due to this, the data flows of inverse multiplex signals obtained from the separate data flows can have a uniform size. The maximum throughput of the intersubnetwork connections is utilized more efficiently due to the uniform size. Further, then, proportionally less reserve capacity for accommodating for peaks needs to be present.

BRIEF DESCRIPTION OF THE DRAWINGS

Specific examples of embodiments of the invention are set forth in the claims. Further details and aspects of the invention will be discussed in the following by way of example with reference to the Figures shown in the drawing, in which:

DETAILED DESCRIPTION OF THE DRAWINGS

Figure 1:
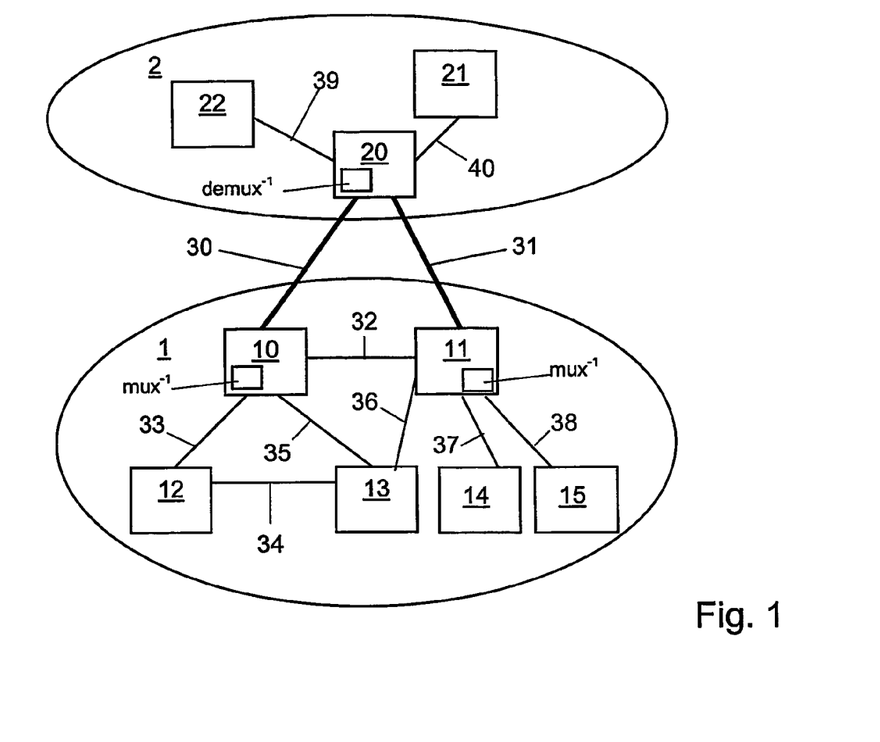
FIG. 1 diagrammatically shows an example of a data communication network according to the invention.

The example shown in FIG. 1 comprises a first subnetwork 1 and a second subnetwork 2. The second subnetwork may, for instance, be a high-speed Internet and the first subnetwork may, for instance, comprise one or more further networks in houses or networks between houses.

The first subnetwork 1 and the second subnetwork 2 are connected with each other via a connecting system comprising intersubnetwork connections 30,31. Both on a first subnetwork side where they are connected with the first subnetwork 1 and on a second subnetwork side where they are connected with the second subnetwork 2, the intersubnetwork connections 30,31 are connected with a routing unit 10,11; 20.

The first subnetwork 1 comprises network nodes 10-15. The network nodes 10-15 comprise network end nodes 12-15 connected with routing units 10 and 11, respectively, via intrasubnetwork connections 33-38. The nodes 10-15 may each be located in separate buildings, for instance houses. It is also possible that two or more nodes are in the same building. Here, the nodes 10-15 may have a physically separate design or form an integrated whole. For instance, a general-purpose computer may simultaneously be used as a client computer, for instance for sending e-mail, and operate as a router. From a functional point of view, the general-purpose computer then comprises two nodes, that is, an end node (client computer) and a connecting node directly connected therewith (the router), but is physically one integral whole (that is, the general purpose computer). It is also possible, for instance, to have a general-purpose computer function as a server for other computers connected with the general-purpose computer and simultaneously as a router for data transmitted from or to these other computers.

The second subnetwork 2 comprises three nodes 20-22, of which a routing unit 20 is connected via the intersubnetwork connections 30, 31 with the first subnetwork 1. The routing unit 20 is connected via respective intrasubnetwork connections 39,40 with the end nodes 22,21. In the first subnetwork 1 in FIG. 1, a first routing unit 10 is directly connected with the network nodes 12,13 in a first subnetwork 1, via intrasubnetwork connections 33,35. A second routing unit 11 is directly connected with end nodes 13-15 via respective intrasubnetwork connections 36-38. The end nodes 12 and 13 are also directly connected with each other by means of an intrasubnetwork connection 34. The two routing units 10,11 are directly connected with each other via an intrasubnetwork connection 32.

It is noted that the nodes 12,13 connected with the first routing unit 10 and the first routing unit 10 can together be considered a first subsubnetwork in the first subnetwork 1. The nodes 13-15 connected with the second routing unit 11 and the second routing unit can be considered a second subsubnetwork in the first subnetwork 1.

A network according to the invention may also have a different topology than that shown in FIG. 1. For instance, the subnetworks 1,2 my have a ring topology or differ otherwise. In particular, the subnetworks 1,2 may contain more or fewer nodes, comprise more or fewer subsubnetworks, be connected with further subnetworks or differ otherwise from the example shown in FIG. 1. Further, the first and second subnetwork 1,2 may be connected with each other by means of more or fewer than the number of intersubnetwork connections shown in FIG. 1 and/or each contain more or fewer routing units than shown in FIG. 1.

The routing units 10,11 in the first subnetwork 1 each comprise an inverse multiplexer ($mux^{-1}$), which may, for instance, be designed like the example shown in FIG. 3, which is described in more detail below. However, the inverse multiplexer may also have a different design. The routing unit 20 in the second subnetwork 2 comprises an inverse demultiplexer, which may, for instance, be designed like the example shown in FIG. 3 or otherwise.

The inverse multiplexer in the first routing unit 10 is arranged to receive data signals transmitted from those end nodes 12,13 to the second subnetwork 2. In the example shown, the inverse multiplexer in the first routing unit 10 is arranged to receive a data flow of original data signals from the end node 12 via the intrasubnetwork connection 33 and a data flow of original data signals from the end node 13 via the intrasubnetwork connection 35 and to distribute the incoming data flows over the intersubnetwork connections 30,31 by means of inverse multiplexing.

The second routing unit 11 in the first subnetwork 1 is also provided with an inverse multiplexer which distributes the incoming data flows from end nodes 13-15 in a similar manner over the intersubnetwork connections 30,31. The data flows to the second subnetwork from the end nodes 12,13 and 13-15, respectively, in the first subnetwork 1 are distributed over the two intersubnetwork connections 30,31 by the inverse multiplexers in the routing units 10,11.

The inverse multiplexers process the received, original data signals in the incoming data flows into inverse multiplex data signals. The inverse multiplex data are transmitted by the inverse multiplexer to the intersubnetwork connection 30,31 connected with the respective routing unit 10,11 and to one or more of the other routing units in the first subnetwork 1.

Figure 3:
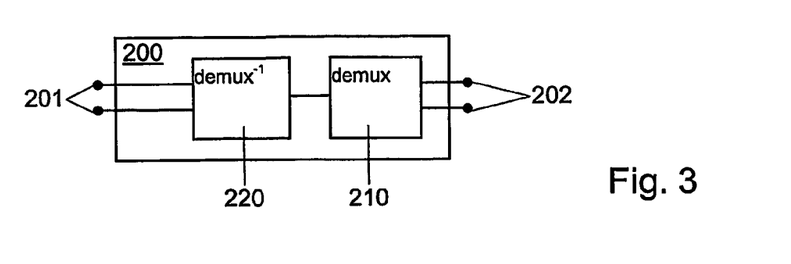
FIG. 3 diagrammatically shows a block diagram of an example of an inverse demultiplexer suitable for use in the example of FIG. 1.

The inverse multiplexer in the routing unit 20 in the second subnetwork 2 may, for instance, be designed like the inverse multiplexer 200 in FIG. 3. However, the inverse multiplexer may also have a different design. The inverse demultiplexer is arranged to receive data flows of inverse multiplex data transmitted by the inverse multiplexers over the intersubnetwork connections 30,31. The inverse multiplexer in the routing unit 20 recovers the original data signals from inverse multiplex data and transmits the recovered original data signals on, for instance to nodes 21,22.

By the inverse (de)multiplexers in the example shown in FIG. 1, the nodes in the second subnetwork 2 receive the original data coming from the (end) nodes in the first subnetwork 1, while all nodes 10-15 in the first subnetwork 1 can use the data throughput of multiple intersubnetwork connections 30,31 present. For each of the nodes 10-15 in the first subnetwork 1, the maximum throughput is thus the added throughput of the intersubnetwork connections 30,31. The maximum throughput can simply be increased by adding intersubnetwork connections and providing suitable inverse (de)multiplexers.

In the example of FIG. 1, the inverse multiplexers in the two routing units 10,11 transmit inverse multiplex data to the other routing unit in the first subnetwork 1 via the intrasubnetwork connection 32 directly connecting the routing units 10,11 with each other. However, the inverse multiplex data may also be transmitted via an indirect connection. For instance, in the example of FIG. 1, by the inverse multiplexer, inverse multiplex data can be transmitted from the first routing unit 10 to the second routing unit 11 in the first subnetwork 1 via the intrasubnetwork connections 35,36 and the node 13.

For transmitting the inverse multiplex data signals to the second subnetwork 2, the inverse multiplex data signals contain destination data indicating that the inverse multiplex data are to be transmitted to the second subnetwork 2. The routing units 10,11 then transmit the inverse multiplex data received from the other routing unit over the intersubnetwork connections 30,31. Thus, by the inverse multiplexers, the incoming data flows from the end nodes 12-15 are distributed over two or more of the intersubnetwork connections 30,31 present as outgoing flows of inverse multiplex data. However, the inverse multiplex data may also be directed to the second subnetwork in a different manner. For instance, the inverse multiplexer may transmit the inverse multiplex data to the intersubnetwork connections via one or more separate data channels connecting the inverse multiplexers with the other intersubnetwork connections 30,31 and over which no other types of data are transmitted.

The inverse multiplexer may be designed such that it distributes the inverse multiplex data over the intersubnetwork connections 30,31 according to a predetermined distribution criterion. The inverse multiplexer can then distribute the data with or without mutual tuning to the other inverse multiplexers in the first subnetwork 1. For instance, each inverse multiplexer can split, without tuning, the incoming data flow of each end node 12-15 into two or more flows of inverse multiplex data of the same size and transmit these to each of the intersubnetwork connections 30,31. When the intersubnetwork connections 30,31 have a throughput which is of substantially the same size, the intersubnetwork connections 30,31 are equally loaded.

Further, by statistical multiplexing, without further complex control devices, a uniform load of the intersubnetwork connections can be realized because peaks and troughs in the data flows transmitted from each of the routing units 10,11 to the respective intersubnetwork connection 30,31 can average each other out in time and are relatively less strong.

Figure 6:
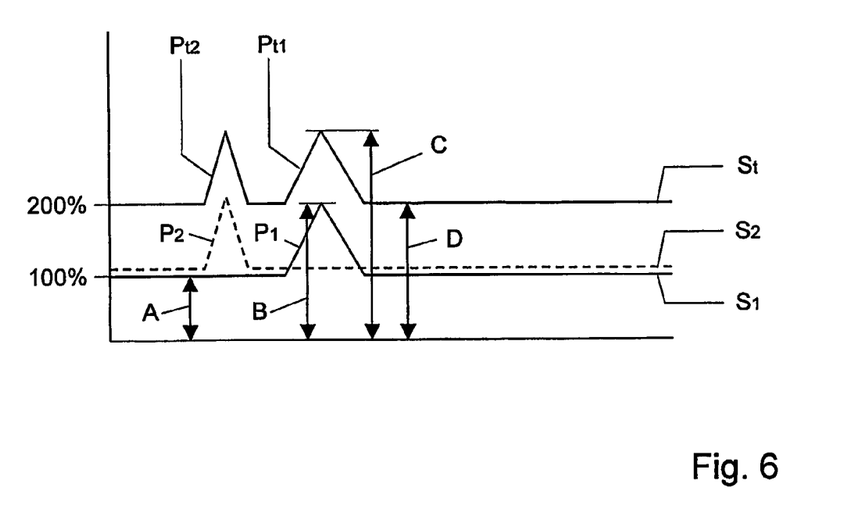
FIG. 6 shows a graph which illustrates statistical multiplexing.

As illustrated in FIG. 6, for instance the data flows $S_1$ from one inverse multiplexer may have a peak pi with a size of 100%, as indicated by arrow B, of the average size of the data flow, as indicated by arrow A, at time $t_1$ and the data flows $S_2$ from a different inverse multiplexer may be equally great on average in time, but have a peak $p_2$ of 100% of the average size at time $t_2$. Then, the relative peak heights of the peaks $pt_1$ at $t_1$ and $pt_2$ at $t_2$ in the flow $S_t$ of the added inverse multiplex data is lower (50% of the average size of the added flows, as indicated by arrows C and D) than in the separate flows of inverse multiplex data. Further, by buffering in, for instance, the routing unit, peaks can be spread in time, so that the (relative) peak height is likewise reduced.

However, the distribution criterion may also have a different design. For instance, the inverse multiplexers may be arranged to split the incoming original data into two or more different flows of inverse multiplex data whose sizes are proportional to the throughput of the intersubnetwork connection through which the respective flow is transmitted, for instance when the intersubnetwork connections 30,31 have different throughputs.

However, other distribution criteria are also possible, for instance based on the number of nodes connected with an intersubnetwork connection, the number of intersubnetwork connections connected at least indirectly with an inverse multiplexer or the like.

Figure 2:
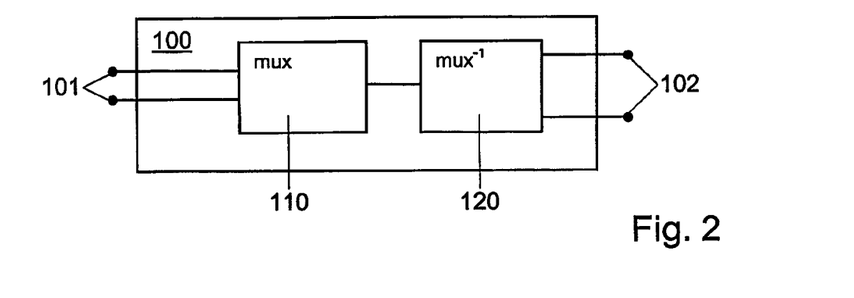
FIG. 2 diagrammatically shows a block diagram of an example of an inverse multiplexer suitable for use in the example of FIG. 1.

FIG. 2 diagrammatically shows an example of an inverse multiplexer 100 suitable for use in a network or a routing unit according to the invention. The example shown of an inverse multiplexer 100 comprises data inputs 101 for receiving incoming data flows. A multiplexer element 110 is connected with data inputs 101. The data inputs 101 may, for instance, be (indirectly) connected with end nodes. The multiplexer element 110 multiplexes the incoming data flows to a single flow of multiplex data. In this example, the multiplex element 110 can be omitted if only one node is connected with the inverse multiplexer 100.

By the multiplex element 110, the flow of multiplex data is added to an inverse multiplex element 120 connected with the multiplex element 110. The inverse multiplex element 120 splits the single flow of multiplex data into multiple flows of inverse multiplex data, by subjecting the multiplex data to an inverse multiplex process known per se, which results in inverse multiplex data. The flow of inverse multiplex data is presented by the inverse multiplexer to the inverse multiplex data outputs 102. In the example of FIG. 1, the inverse multiplex data outputs may, for instance, be connected with the intersubnetwork connection 30,31 and/or the intrasubnetwork connection 32 between the routing units 10,11.

After receipt in the second subnetwork 2, the different flows of inverse multiplex data can be converted into the flows of original data again, for instance by the example of an inverse demultiplexer 200 shown in FIG. 3. The example shown in FIG. 3 comprises two inverse multiplex data inputs 201 for receiving incoming flows of inverse multiplex data. An inverse-demultiplexed element 220 is connected with the inverse multiplex data inputs 201. The inverse multiplex element 220 combines the incoming inverse multiplex data into one outgoing data flow by inverse demultiplexing the incoming inverse multiplex data. In the case that the inverse multiplex data are generated with the inverse multiplexer 100 of FIG. 2, this results in the multiplex data. The outgoing data flow is supplied by the inverse demultiplexer 220 to a demultiplexer 210 connected with the inverse multiplexer 220. The demultiplexer 210 recovers the flows of original data from the incoming flow of multiplex data. The recovered original data are then supplied by the demultiplexer 210 to data outputs 202, which may, for instance in FIG. 1, be connected with nodes 21,22.

Figure 4:
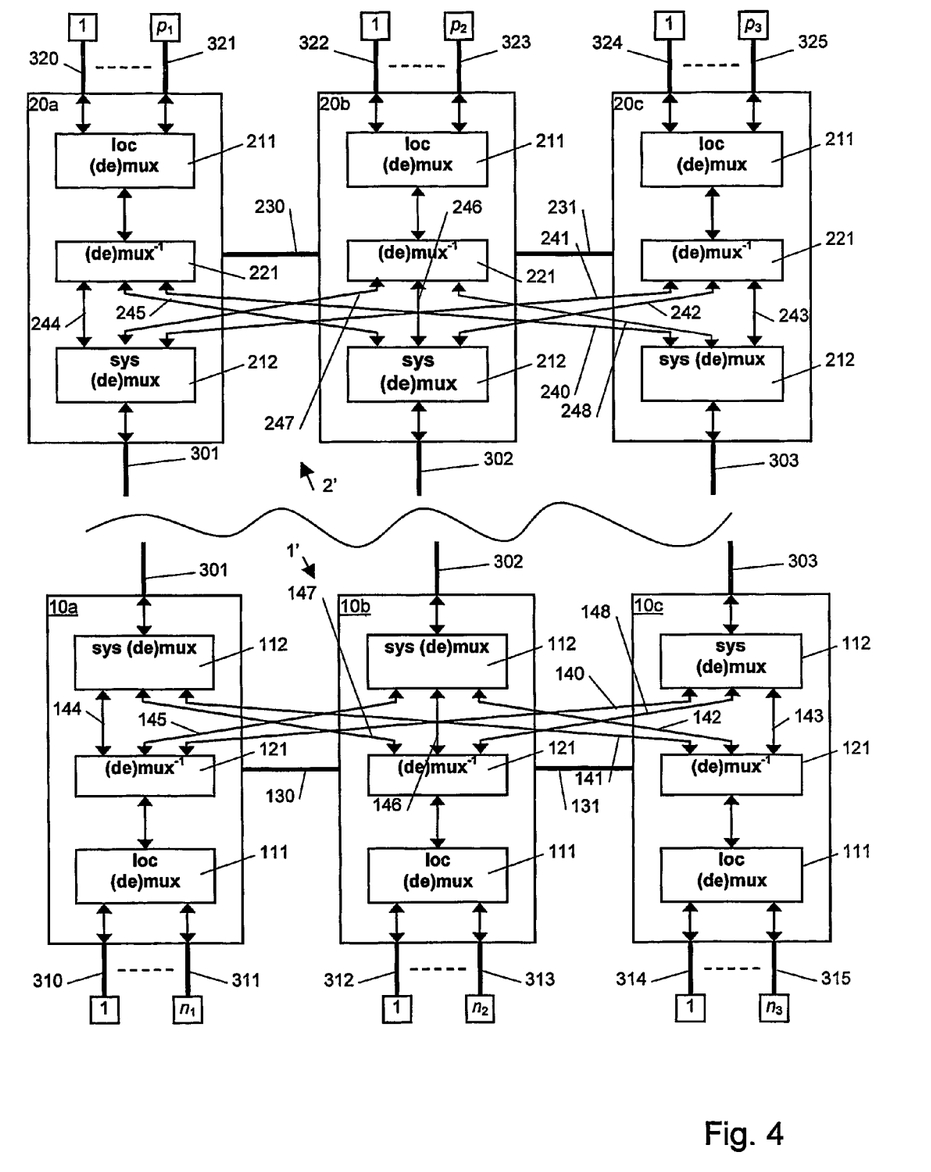
FIG. 4 diagrammatically shows a block diagram of an example of a connecting system according to the invention.

FIG. 4 diagrammatically shows a block diagram of an example of a connecting system according to the invention. The connecting system comprises routing units 10a-10c, on a first subnetwork side 1', which are connected with routing units 20a-20c on a second subnetwork side 2' by means of intersubnetwork connections 301-303.

The routing units 10a-10c and 20a-20c, respectively, are provided with transmission equipment, not shown and known per se, to receive incoming data and to transmit them via an output suitable for the destination of the data. The lines in FIG. 4 represent physical connections, whereas the arrows represent communication between different entities, while use may then be made of the transmission equipment (not shown) in the routing units and the physical connections present.

The routing units 10a-10c are each connected with each other by means of intrasubnetwork connections 130,131. The routing units 10a-10c are also connected with further nodes $1\text{-}n_1$, $1\text{-}n_2$ and $1\text{-}n_3$, respectively, in the first subnetwork 1 by means of intrasubnetwork connections 310,311, 312,313, and 314,315, respectively. The routing units 20a-20c are each mutually connected by means of intrasubnetwork connections 230,231. The routing units 20a-20c are further connected with nodes $1\text{-}p_1$, $1\text{-}p_2$ and $1\text{-}p_3$, respectively, in the second subnetwork 2 by means of intrasubnetwork connections 320,321, 322,323 and 324,325, respectively.

The routing units 10a-10c on the first subnetwork side 1' each comprise a local (de)multiplexer, loc (de)mux 111, which is connected with the intrasubnetwork connections 310,311, 312,313 and 314,415, respectively. The loc (de)mux 111 is connected with an inverse (de)multiplexer 121 (de-mux$^{-1}$). The inverse (de)multiplexer 121 in each of the routing units 10a-10c can present a flow of inverse multiplex data to a system (de)multiplexer, sys (de)mux 112 in the respective routing unit, as indicated by the arrows 143, 144 and 146, respectively. The inverse (de)multiplexer 121 can also transmit flows of inverse multiplex data to system (de)multiplexers 112 in the other routing units, as indicated by the double arrows 140,145, 141,142 and 147,148, respectively. The system (de)multiplexers 112 are communicatively connected with the intersubnetwork connections 301, 302 and 303, respectively.

As indicated by the arrows in FIG. 4, the routing units 10a-10c; 20a-20c can process data flows both in an upward direction, from the first subnetwork side 1' to the second subnetwork side 2', and in a downward direction, opposite to the upward direction, from the second subnetwork side 2' to the first subnetwork side 1'.

Here, the (inverse) (de)multiplexers 111, 112, 121 on the first subnetwork side 1' function as (inverse) multiplexers for data transmitted from the first subnetwork side 1' to the second subnetwork side 2', while they function as (inverse) demultiplexers for data flowing from the second subnetwork side 2' to the first subnetwork side 1'. Conversely, the (inverse) (de)multiplexers 211, 212, 221 on the second subnetwork side 2' function as (inverse) demultiplexers for data transmitted from the first subnetwork side 1' to the second subnetwork side 2', while they function as (inverse) multiplexers for data flowing from the second subnetwork side 2' to the first subnetwork side 1'.

In use, data destined for the second subnetwork side 2' coming from the nodes 1-$n_1$, 1-$n_2$ or 1-$n_3$ connected with the respective routing unit 10a-10c are supplied to the respective loc (de)mux 111. The loc (de)mux 111 multiplexes these data flows to a flow of multiplex data and presents these to the inverse (de)multiplexer 121. Each of the local (de)multiplexers 111 thus receives only data from the nodes 1-$n_1$, 1-$n_2$ and 1-$n_3$, respectively, which are connected to the respective routing unit 10a-10c. The inverse (de)multiplexer 121 inverse-multiplexes the multiplex data in two or more flows of inverse multiplex data. Those flows are each presented to a different system (de)multiplexer 112 by the inverse multiplexer 121. The system (de)multiplexers 121 thus receive flows of inverse multiplex data from the different routing units 10a-10c. The system (de)multiplexers 121 combine the incoming inverse multiplex data flows to one single flow of data which is transmitted over the intersubnetwork connections 301 connected with the respective (de)multiplexer to the second subnetwork 2.

The flow of data transmitted to the second subnetwork 2 is, on the second subnetwork side 2', for each of the intersubnetwork connections 301-303, received by a system (de)multiplexer 212 in each of the routing units 20a-20c. In use, each of these system (de)multiplexers 212 carries out an operation which is substantially opposite to the method of the system (de)multiplexers 112 on the first subnetwork side 1'. The system (de)multiplexers 112 thus recover the flows of inverse multiplex data which have been transmitted from the inverse demultiplexers 121 on the first subnetwork side 1', by demultiplexing the incoming data into two or more flows of demultiplexed data. The flows of recovered inverse multiplex data are then presented by the system (de)multiplexers 212 to both an inverse (de)multiplexer 221 in the respective routing unit 20a-20c, as indicated by the arrows 244, 246 and 243, respectively, and to the inverse (de)multiplexers 221 in the other routing units 20a-20c, as indicated by the arrows 240-242, 245, 247 and 248, respectively, which may, for instance, be carried out by transmitting these flows over the intrasubnetwork connections 230, 231 to the respective inverse (de)multiplexers.

The inverse (de)multiplexers 221 combine the different incoming flows of recovered inverse demultiplex data to a flow of inverse demultiplexed data by a method which is substantially the inverse of the method carried out by the inverse (de)multiplexers 121 in the first subnetwork. The inverse (de)multiplexers 221 in routing units 20a-20c on the second subnetwork side 2' thus recover the multiplex data transmitted from the local (de)multiplexers 111.

The recovered multiplex data are presented by the inverse (de)multiplexers 221 to local (de)multiplexers 211, which recover the original flows of data from the recovered multiplex data. The local (de)multiplexers 211 present the recovered original data to an intrasubnetwork connection 320-325 which matches the data and transmit the data over this to nodes 1-$p_1$, 1-$p_2$ and 1-$p_3$, respectively, in the second subnetwork 2.

For data transmitted from the second subnetwork 2 to the first subnetwork 1, the routing units 20a-20c on the second subnetwork side 2' operate in a similar manner to the routing units 10a-10c on the first subnetwork side 1' processing data transmitted from the first subnetwork 1 to the second subnetwork 2. The routing units 10a-10c on the first subnetwork side 1' operate in a similar manner to the routing units 20a-20c on the second subnetwork side 2'.

Figure 5:
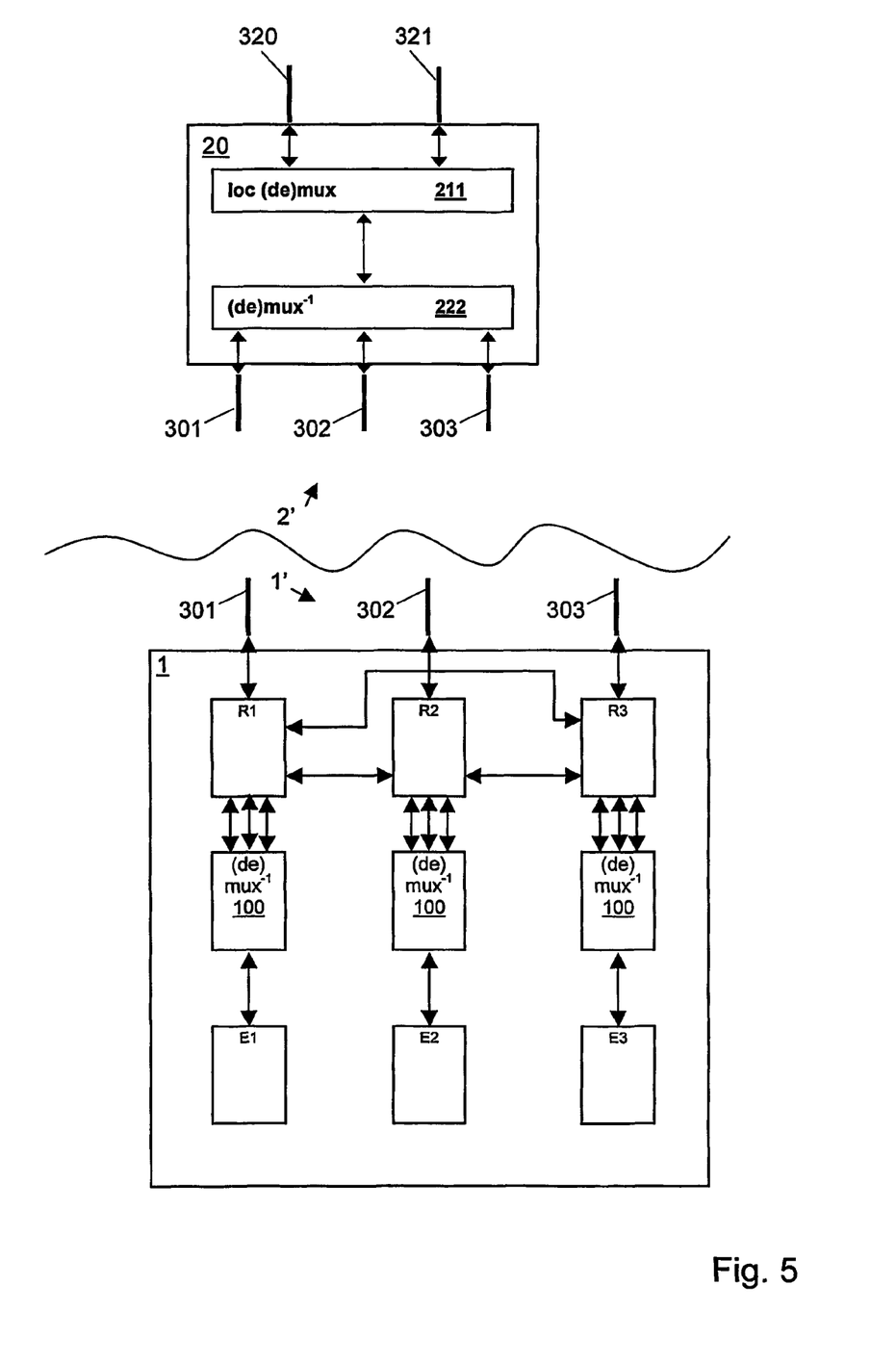
FIG. 5 diagrammatically shows a block diagram of an example of subnetwork and a connecting system connected thereto for in a data communication network according to the invention.

It is noted that, in the example of FIG. 4, the system (de)multiplexers can be omitted if there is only one routing unit in the respective subnetwork, such as for instance shown in FIG. 5 in the second subnetwork. Also, the local (de)multiplexer can be omitted if the respective routing unit is connected with only one intrasubnetwork connection.

The example diagrammatically shown in FIG. 5 comprises a first subnetwork 1 with end nodes E1-E3, for instance computers in different houses. Each of the end nodes E1-E3 is connected with a local inverse (de)multiplexer 100. The local inverse (de)multiplexers 100 each have an inverse multiplexer input with which they are connected with the respective end node and two or more inverse multiplexer outputs. The inverse multiplexer outputs are each connected with a system (de)multiplexer, in the present example designed as a routing element R1-R3 having the functionality of a system (de)multiplexer, as is described in more detail hereinbelow. Each of the local inverse (de)multiplexers 100 is connected with a separate routing element R1-R3. Each of the routing elements R1-R3 is connected both with the other routing elements and with an intersubnetwork connection 301-303.

The end nodes E1-E3 can each transmit data to a local inverse (de)multiplexer 100 connected with the end node E1-E3. The local inverse (de)multiplexers 100 can each split this flow of data into two or more flows of inverse multiplex data. Via the inverse multiplexer outputs, the flows of inverse multiplex data can be presented to inputs of the routing elements R1-R3. The routing elements R1-R3 transmit a part of the incoming flows of inverse multiplex data to an intersubnetwork output connected with the intersubnetwork connection 301-303. Another part of the flows of inverse multiplex data is transmitted to the other routing elements R1-R3.

Thus, each routing element R1-R3 receives not only inverse multiplex data from the local inverse (de)multiplexer 100 directly connected therewith, but also flows of inverse multiplex data coming from the other routing elements R1-R3. The flows of inverse multiplex data coming from the other routing elements R1-R3 are guided to the intersubnetwork output by the respective routing element R1-R3 and mixed with the flow of inverse multiplex data coming from the local inverse (de)multiplexer directly connected with the respective routing element. The routing elements R1-R3 thus function as system (de)multiplexers. The data flow coming from an end node is thus distributed over two or more intersubnetwork connections 301-303, in this example all intersubnetwork connections present.

It is also possible that instead of the end nodes E1-E3, one or more subsubnetworks are connected with the inverse multiplexer. For instance, network servers may be provided at the location of the end nodes E1-E3, which network servers are then connected with further nodes in the respective subsubnetwork. The subsubnetworks may, for instance, be Internet networks in different houses, and the network server may be the Internet server of an Internet provider. These subsubnetworks can then be connected by means of the connecting system with a network in a different city, so that the throughput speed between the networks in the different cities can be increased. In addition, the intersubnetwork connection can then have a wireless design, for instance by means of a radio link, or the intersubnetwork connection may comprise existing lines, such as a rented line, thereby avoiding the necessity for installing, for instance, glass connections between cities.

The intersubnetwork connections 301-303 on the second subnetwork side 2' are all three connected with the same routing unit 20. The routing unit 20 comprises an inverse (de)multiplexer 222 and a local (de)multiplexer 211. The flows of inverse multiplex data from all three intersubnetwork connections 301-303 shown coming from the first subnetwork 1 are inverse-demultiplexed by the inverse (de)multiplexer 222 into a flow of data which is presented to the local (de)multiplexer 211. The local (de)multiplexer 211 demultiplexes this flow into multiple flows of data which are presented to suitable intrasubnetwork connections 320-321 in the second subnetwork 2'.

Existing subnetworks can simply be modified to the example shown in FIG. 5. For instance, an existing configuration in which there are one or more end nodes, that is, personal computers in the house which are connected via an ADSL (or cable) modem or router with a network located outside the house (the Internet), can be modified to the example shown in FIG. 5. For instance the computer or the router can then be suitably provided with a computer program or hardware providing inverse multiplex functionality, and the routers in different houses can be wirelessly connected with each other in a manner known per se. For instance, the routers can be connected by means of a Wireless local area network (WLAN) device known per se or meshed wireless network connections, such as for instance the systems available under the brand names of: Mesh networks, Rooftop networks and Hiperlan.

The intersubnetwork connection may also be wireless and comprise, for instance, a radio connection, thereby avoiding the necessity for installing special connections with high throughput capacity, for instance glass connections.

In the example shown in FIG. 5, the ratio of the number of end nodes to the number of intersubnetwork connections is 1:1, so that the average capacity available per end node is at least equal to that of one intersubnetwork connection. However, it is also possible to provide for a different ratio, for instance, multiple end nodes per intersubnetwork connection may be provided. It is also possible to provide a proportion of multiple intersubnetwork connections per end node so that the average available capacity per end node is increased.

The invention is not limited to the above-described examples. After reading the above, variants will be obvious to a skilled person. It is, for instance, obvious to design the invention as a computer program comprising computer code for carrying out one or more steps of a method according to the invention when it is loaded in a programmable device, such as for instance a computer, a telephone exchange, a router or the like. Such a computer program may be provided on a physical (data) carrier, such as a magnetic storage medium, an optical data carrier, a medium for signal transmission or other medium.

It is also obvious to design one or more elements in a device, although logically separate, in a physically integrated manner. For instance, in the example of FIG. 5, the inverse (de)multiplexers may be located in a same physical device as the end nodes, but, in this example, the inverse (de)multiplexers may also be designed in a same physical device as the routing elements. Also, for instance, in the example shown in FIG. 4, different inputs or outputs may be designed as one physical connecting point where different data flows are inputted or outputted.

Preferably, for the intersubnetwork connections, use is made of "local loop" telephone lines, with, for instance, normal, DSL or ADSL transmission. The term local loop is known to a skilled person and refers to the last, individual connections from the telephone network to the terminals with individual subscribers.

In the above-described, the first and the second subnetwork can essentially be interchanged, so that what has been described about inverse multiplexing in the first subnetwork and inverse demultiplexing in the second subnetwork also applies to inverse demultiplexing in the first subnetwork and inverse multiplexing in the second subnetwork. However, the subnetworks do not need to be symmetrical. For instance, in the case of communication over local loop lines, between terminals of different subscribers and an exchange, preferably, in the exchange, a common inverse multiplexer and/or demultiplexer is used for the different nodes. This common inverse multiplexer and/or demultiplexer then transmits respective recovered original data from different nodes on to different destinations, or performs inverse multiplexing on messages for the different nodes in order to transmit the resulting inverse multiplex signals so as to be distributed over different local loop connections. One embodiment provides only inverse multiplexing on the side of the exchange and only inverse demultiplexing on the side of the subscriber terminals. This is sufficient in many applications where much more data are transmitted to the nodes than from the nodes. In that case, the original data can be transmitted over a single local loop connection from the nodes to the exchange without inverse multiplexing.

In another embodiment, a plurality of inverse multiplexers or demultiplexers are provided on the side of the exchange, for instance one for each node. In this case, multiplex data from different nodes received via multiple intersubnetwork connections are guided to a selected demultiplexer, or original data coming from the subnetwork for different nodes are multiplexed by different inverse multiplexers and transmitted via multiple intersubnetwork connections.

The word "comprising" does not exclude the presence of one or more other elements than mentioned. The word "a" does not exclude more than one being used.

The invention claimed is:

1. A telecommunication network, comprising:
   a first subnetwork;
   a plurality of nodes in the first subnetwork;
   a plurality of physically separate intersubnetwork connections for connection of the first subnetwork with a second subnetwork, each one of the plurality of physically separate intersubnetwork connections having a first subnetwork side and second subnetwork side;
   a plurality of inverse demultiplexers, wherein each one of the plurality of inverse demultiplexers has an output connected with a respective node of the plurality of nodes, each one of the plurality of inverse demultiplexers being arranged for receiving a plurality of inverse multiplex data signals, recovering an original signal, transmitted from the second subnetwork, from the plurality of inverse multiplex data signals and presenting the recovered original signal to the respective node of the receiving one of the plurality of inverse demultiplexers; and
   a plurality of system demultiplexers, each one of the plurality of system demultiplexers being connected between an input of each one of the plurality of inverse demultiplexers and at least one of the physically separate intersubnetwork connections, wherein each one of the plurality of system demultiplexers is connected with a different one of the plurality of physically separate intersubnetwork connections, and the plurality of system demultiplexers are arranged for receiving the plurality of inverse multiplex data signals from the second subnetwork, wherein each one of the plurality of inverse multiplex data signals for a same one of the plurality of inverse demultiplexers are each received over a different one of the plurality of physically separate intersubnetwork connections; wherein each one of the plurality of system demultiplexers has a plurality of connections to transmit inverse multiplex data signals to each one of the plurality of inverse demultiplexers.

2. The telecommunication network according to claim 1, wherein each one of the plurality of physically separate intersubnetwork connections comprises a different local loop telephone connection.

3. The telecommunication network according to claim 2, wherein at least two nodes on the first subnetwork side are located in different buildings.

4. The telecommunication network according to claim 1, wherein at least one of the plurality of physically separate intersubnetwork connections is a broadband connection.

5. The telecommunication network according to claim 4, wherein at least one of the broadband connections has a data throughput speed between 0.5 and 2.0 Mbps in the direction from the second subnetwork to the first subnetwork.

6. The telecommunication network according to claim 1, wherein the number of physically separate intersubnetwork connections is smaller than the number of nodes connectable with the connecting system in the first subnetwork.

7. The telecommunication network according to claim 1, wherein the number of physically separate intersubnetwork connections is equal to the number of end nodes in the first subnetwork connectable with the second subnetwork via the intersubnetwork connections.

8. The telecommunication network according to claim 1, wherein each one of the plurality of physically separate intersubnetwork connections comprises a different local loop telephone connection.

9. The telecommunication network according to claim 4, wherein at least one of the plurality of physically separate intersubnetwork connections is an ADSL connection.

10. A telecommunication network, comprising:
a first subnetwork;
a plurality of nodes in the first subnetwork;
a plurality of physically separate intersubnetwork connections for connection of the first subnetwork to a second subnetwork, each one of the plurality of physically separate intersubnetwork connections having a first subnetwork side and second subnetwork side;
a plurality of inverse multiplexers, wherein each one of the plurality of inverse multiplexers has an input connected with a respective node of the plurality of nodes, each one of the plurality of inverse multiplexers being arranged for receiving an original data signal transmitted from the respective node for transmission to the second subnetwork and inverse multiplexing the original data signal to a plurality of inverse multiplex data signals for transmitting the original data signal to the second subnetwork via the plurality of physically separate intersubnetwork connections in an inverse-multiplexed manner; and
a plurality of system multiplexers, each one of the plurality of system multiplexers being connected between outputs of a plurality of the inverse multiplexers and at least one of the plurality of physically separate intersubnetwork connections, wherein each one of the plurality of system multiplexers is connected with a different one of the plurality of physically separate intersubnetwork connections, and the plurality of system multiplexers are arranged for transmitting the inverse multiplex data signals to the second subnetwork, wherein the plurality of inverse multiplex data signals from a same one of the plurality of inverse multiplexers are each transmitted over a different one of the plurality of physically separate intersubnetwork connections; wherein each one of the plurality of system multiplexers is arranged to receive and transmit inverse multiplex data signals from each of the plurality of inverse multiplexers;
a plurality of inverse demultiplexers, wherein each one of the plurality of inverse demultiplexers has an output connected with a respective node of the plurality of nodes, each one of the plurality of inverse demultiplexers being arranged for receiving a plurality of inverse multiplex data signals, recovering an original signal, transmitted from the second subnetwork, from the plurality of inverse multiplex data signals and presenting the recovered original signal to the respective node of the receiving one of the plurality of inverse demultiplexers; and
a plurality of system demultiplexers, each one of the plurality of system demultiplexers being connected between an input of each one of the plurality of inverse demultiplexers and at least one of the physically separate intersubnetwork connections, wherein each one of the plurality of system demultiplexers is connected with a different one of the plurality of physically separate intersubnetwork connections, and the plurality of system demultiplexers are arranged for receiving the plurality of inverse multiplex data signals from the second subnetwork, wherein each one of the plurality of inverse multiplex data signals for a same one of the plurality of inverse demultiplexers are each received over a different one of the plurality of physically separate intersubnetwork connections; wherein each one of the plurality of system demultiplexers has a plurality of connections to transmit inverse multiplex data signals to each one of the plurality of inverse demultiplexers.

11. A telecommunication network, comprising:
a first subnetwork including a plurality of nodes;
a second subnetwork including a plurality of nodes;
a plurality of physically separate intersubnetwork connections for connection of the first subnetwork to the second subnetwork, each one of the plurality of physically separate intersubnetwork connections having a first subnetwork side and second subnetwork side;
wherein the first subnetwork comprises a plurality of inverse multiplexers, wherein each one of the plurality of inverse multiplexers has an input connected with a respective node of the plurality of nodes of the first subnetwork, each one of the plurality of inverse multiplexers being arranged for receiving an original data signal transmitted from the respective node for transmission to the second subnetwork and inverse multiplexing the original data signal to a plurality of inverse multiplex data signals for transmitting the original data signal to the second subnetwork via the plurality of physically separate intersubnetwork connections in an inverse-multiplexed manner;
wherein the first subnetwork comprises a plurality of system multiplexers, each one of the plurality of system multiplexers being connected between outputs of a plurality of the inverse multiplexers and at least one of the plurality of physically separate intersubnetwork connections, wherein each one of the plurality of system multiplexers is connected with a different one of the plurality of physically separate intersubnetwork connections, and the plurality of system multiplexers are arranged for transmitting the inverse multiplex data signals to the second subnetwork, wherein the plurality of inverse multiplex data signals from a same one of the plurality of inverse multiplexers are each transmitted over a different one of the plurality of physically separate intersubnetwork connections, wherein each one of the plurality of system multiplexers is arranged to receive and transmit inverse multiplex data signals from each of the plurality of inverse multiplexers;

wherein the second subnetwork comprises a plurality of inverse demultiplexers, wherein each one of the plurality of inverse demultiplexers has an output connected with a respective node of the plurality of nodes of the second subnetwork, each one of the plurality of inverse demultiplexers being arranged for receiving a plurality of inverse multiplex data signals, recovering an original signal, transmitted from the second subnetwork, from the plurality of inverse multiplex data signals and presenting the recovered original signal to the respective node of the receiving one of the plurality of inverse demultiplexers; and wherein the second subnetwork comprises a plurality of system demultiplexers, each one of the plurality of system demultiplexers being connected between an input of each one of the plurality of inverse demultiplexers and at least one of the physically separate intersubnetwork connections, wherein each one of the plurality of system demultiplexers is connected with a different one of the plurality of physically separate intersubnetwork connections, and the plurality of system demultiplexers are arranged for receiving the plurality of inverse multiplex data signals from the second subnetwork, wherein each one of the plurality of inverse multiplex data signals for a same one of the plurality of inverse demultiplexers are each received over a different one of the plurality of physically separate intersubnetwork connections, wherein each one of the plurality of system demultiplexers has a plurality of connections to transmit inverse multiplex data signals to each one of the plurality of inverse demultiplexers.

* * * * *